US011064708B2

United States Patent
Stryker et al.

(10) Patent No.: US 11,064,708 B2
(45) Date of Patent: Jul. 20, 2021

(54) PROCESS TO PRODUCE SAFE PASTEURIZED SHRIMP AND OTHER SHELLFISH OF HIGH SENSORY QUALITY AND EXTENDED REFRIGERATED SHELF-LIFE

(71) Applicants: Robert B. Stryker, Crownsville, MD (US); Edward M. Dixon, Ellicott City, MD (US)

(72) Inventors: Robert B. Stryker, Crownsville, MD (US); Edward M. Dixon, Ellicott City, MD (US); Thomas E. Rippen, Salisbury, MD (US)

( * ) Notice: Subject to any disclaimer, the term of this patent is extended or adjusted under 35 U.S.C. 154(b) by 517 days.

(21) Appl. No.: 14/590,501

(22) Filed: Jan. 6, 2015

(65) Prior Publication Data
US 2015/0196040 A1  Jul. 16, 2015

Related U.S. Application Data

(60) Provisional application No. 61/925,907, filed on Jan. 10, 2014.

(51) Int. Cl.
| A23B 4/005 | (2006.01) |
| A23B 4/02 | (2006.01) |
| A23B 4/023 | (2006.01) |
| A23L 17/40 | (2016.01) |

(52) U.S. Cl.
CPC .............. *A23B 4/0056* (2013.01); *A23B 4/02* (2013.01); *A23B 4/023* (2013.01); *A23L 17/40* (2016.08)

(58) Field of Classification Search
CPC ......... A23B 4/0056; A23B 4/023; A23B 4/02; A23L 1/33
See application file for complete search history.

(56) References Cited

U.S. PATENT DOCUMENTS

| 2,320,982 A | 6/1942 | Bensel |
| 2,365,519 A | 12/1944 | Bloedorn |
| 2,488,184 A | 11/1949 | Garnatz et al. |
| 2,600,627 A | 6/1952 | Envoldsen |
| 2,758,929 A | 8/1956 | Toulmin |
| 2,758,930 A | 8/1956 | Toulmin |
| 2,870,025 A | 1/1959 | Fellers et al. |
| 3,501,317 A | 3/1970 | Veltman |
| 3,705,040 A * | 12/1972 | Bynagte .................... A23B 4/02 426/442 |
| 3,773,962 A * | 11/1973 | Baranauskas ............. A23L 1/33 426/479 |
| 3,852,486 A * | 12/1974 | Walker .................... A23B 4/005 426/241 |
| 4,221,819 A * | 9/1980 | Falci ........................ A23B 4/08 426/262 |
| 4,741,911 A | 5/1988 | McIntyre et al. |
| 4,971,821 A | 11/1990 | McIntyre |
| RE33,510 E * | 1/1991 | Williams ............. A23B 4/0053 126/369 |
| 5,188,854 A * | 2/1993 | Hartman ................. A23L 17/75 426/272 |
| 5,268,189 A | 12/1993 | Doerter |
| 5,370,895 A | 12/1994 | Doerter |
| 5,635,231 A | 6/1997 | Bender et al. |
| 5,916,617 A | 6/1999 | Polster |
| 6,099,400 A | 8/2000 | Ragnarsson et al. |
| 6,274,188 B1 * | 8/2001 | Ledet .................... A23L 1/0121 426/510 |
| 7,179,160 B2 | 2/2007 | Hulin |
| 8,257,771 B2 | 9/2012 | Umeda et al. |
| 2004/0191379 A1 * | 9/2004 | Higuchi ................. A22C 29/02 426/506 |
| 2004/0224075 A1 | 11/2004 | Sugiyama et al. |
| 2006/0222747 A1 * | 10/2006 | Thomas ................. A23B 4/005 426/407 |
| 2006/0240159 A1 | 10/2006 | Cash et al. |
| 2008/0254167 A1 * | 10/2008 | McMindes ................ A23J 3/16 426/72 |
| 2010/0272873 A1 * | 10/2010 | Paterson .................... A23L 1/33 426/393 |
| 2011/0151071 A1 * | 6/2011 | Ablett .................... A23B 4/052 426/129 |

FOREIGN PATENT DOCUMENTS

| CN | 101878928 | 11/2010 |
| CN | 101878928 A | * 11/2010 |
| CN | 101946917 | 6/2013 |
| EP | 0721743 | 7/1996 |

OTHER PUBLICATIONS

FAO—Handling and Processing fo Shrimp, Mar. 9, 2011 http://web.archive.org/web/20110309103911/http://www.fao.org/wairdocs/tan/x5931e/x5931e01.htm.*
Appendix A Guidance on Relative Humidity Aug. 24, 2012 http://web.archive.org/web/20120824143358/http://www.fsis.usda.gov/OPPDE/rdad/FRPubs/95-033F/.*
"Food Pathogen Control Data Summary" Oct. 5, 2011 http://web.archive.org/web/20111005055830/http://www.hi-tm.com/RFA/food-path-summ.pdf.*
Price, Robert. "Compendium of Fish and Fishery Product Processes, Hazards and Controls." Chapter 3 http://web.archive.org/web/20110927063626/http://seafood.ucdavis.edu/haccp/compendium/compend.htm (Year: 2011).*

* cited by examiner

*Primary Examiner* — Viren A Thakur

(57) ABSTRACT

A system and method for processing shrimp and other shellfish species are disclosed. Embodiments of the disclosed system and method provide a shellfish product having a longer refrigerated shelf-life than experienced with conventional processing methods and the shellfish product produced retains more of its original sensory qualities, such as texture, flavor and odor, than is retained by current processing methods.

6 Claims, 1 Drawing Sheet

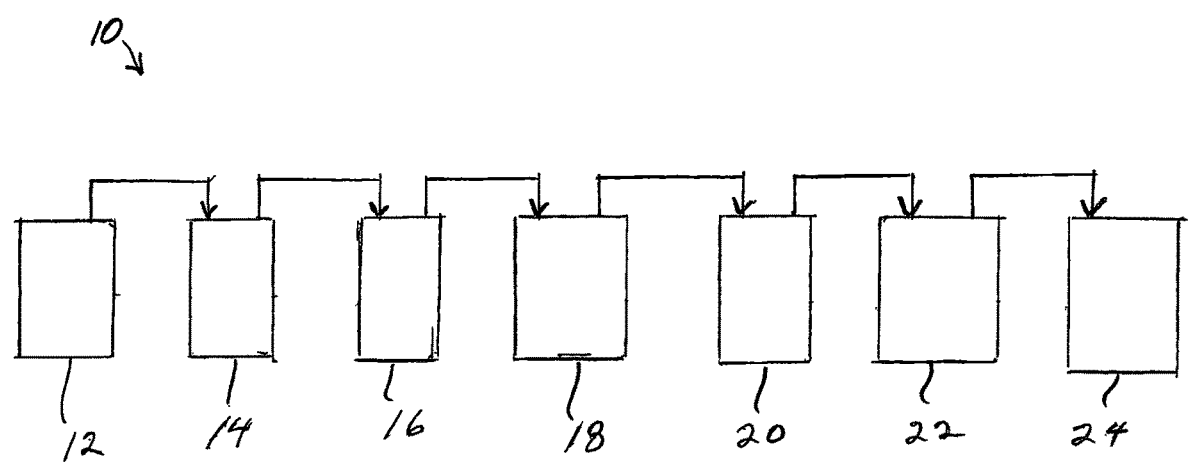

PROCESS TO PRODUCE SAFE PASTEURIZED SHRIMP AND OTHER SHELLFISH OF HIGH SENSORY QUALITY AND EXTENDED REFRIGERATED SHELF-LIFE

CROSS-REFERENCE TO RELATED APPLICATION

This application claims priority to U.S. Provisional Application No. 61/925,907, filed Jan. 10, 2014, the disclosure of which is hereby incorporated by reference in its entirety.

TECHNICAL FIELD

The present disclosure relates generally to a system and method for producing a packaged shellfish. More particularly, the invention is directed to a method for processing and packaging shrimp to extend the shelf life when refrigerated without loss of water from the shrimp during processing and storage. The invention described herein focuses on a system and method for pasteurizing shellfish species other than crab.

BACKGROUND

Past attempts to commercially produce pasteurized shrimp and other shellfish products of acceptable market quality have largely failed due to problems with product yields, texture, flavor, odor, and/or appearance. These and other problems substantially result from the extensive heat processes used to both render pasteurized seafood safe and to provide sufficient shelf-life for their subsequent distribution and sale. When properly pasteurized following standard industry practices, meat from most crabs do not exhibit such defects due to their more heat tolerant muscle structure and such products are widely distributed and well received by consumers.

For example, to ensure the safety of pasteurized shrimp sold to the consuming public in hermetically sealed flexible or rigid containers, a thermal process is performed that is sufficient to eliminate bacteria in the food, including the most heat-resistant strains of non-proteolytic *Clostridium botulinum* bacteria, i.e., non-proteolytic B. It is possible to process shellfish using more mild partial-pasteurization methods resulting in a shelf life of 3-6 months. These methods arguably can result in shrimp and other shellfish that have a favorable sensory quality, but such processes would also create conditions conducive for the growth of dangerous *C. botulinum* bacteria, which produces a neurotoxin causing botulism if ingested.

When the amount of air is limited in a container, for example, when containers are sealed/seamed, the resulting anaerobic conditions favor the growth of *C. botulinum*. If the container is then mildly heat processed, competing spoilage bacteria are eliminated/killed while the more heat resistant *C. botulinum* spores survive. Such processes are also likely to heat-shock *C. botulinum* spores which triggers germination necessary for the microorganism's growth. As a result of eliminating spoilage bacteria, the shelf-life of the food within the container is extended. But this extension provides time for slow growing *C. botulinum* to grow. Taken together, mild thermal processing in sealed packaging, sub-lethal to *C. botulinum*, provide conditions conducive to *C. botulinum* growth and toxin formation. The *C. botulinum* microorganism is responsible for deadly botulism poisoning and is the target bacteria identified by the U.S. Food and Drug Administration (FDA) for pasteurized shrimp and similar products.

Table 1 is from the U.S. FDA's publication, *FDA Fish and Fishery Products Hazards and Controls Guidance*, 4$^{th}$ ed., Chapter 16, page 317. This table provides guidance for different shellfish product categories, including pasteurized shrimp and most other shellfish that require a minimum cumulative process lethality of $F_{194F}^{12.6F}=10$ minutes. As shown in the table, the acceptable process for shrimp, which is included in the general fish and fishery products category, is more extensive, that is, increased heat exposure is required for these foods than for the pasteurized meat of blue crabs and other swimming crabs.

TABLE 1

EXAMPLES OF PROPERLY PASTEURIZED PRODUCTS

| PRODUCT | MINIMUM CUMULATIVE TOTAL LETHALITY | Z VALUE |
| --- | --- | --- |
| Fish and fishery products generally (e.g., surimi-based products, soups or sauces) | $F_{194°F.}$ ($F_{90°C.}$) = 10 minutes | 12.6° F. (7° C.), for temperatures less than 194° F.(90° C.) 18° F. (10° C.), for temperatures above 194° F.(90° C.) |
| Blue crabmeat | $F_{185°F.}$ ($F_{85°C.}$) = 31 minutes | 16° F. (9° C.) |
| Dungeness crabmeat | $F_{194°F.}$ ($F_{90°C.}$) = 57 minutes | 15.5° F. (8.6° C.) |

In accordance with U.S. regulations, every processor of seafood, including shrimp and other shellfish, is required to thoroughly evaluate food safety hazards associated with the products they produce. Based on this evaluation the processors must then develop appropriate controls for ensuring the safety of the consuming public. For example, according to the Code of Federal Regulations, specifically at Title 21, Chapter 123 (21 C.F.R. 123), seafood processors must implement a Hazard Analysis Critical Control Point (HACCP) plan as well as monitor certain key sanitation conditions, and pursuant to 21 C.F.R. 110 they must also engage Good Manufacturing Practices.

Also, according to these regulations, any process that optimizes product sensory quality, for example to present the shellfish in a manner that is more appealing to potential purchasers of the shellfish, but at the same time increases food safety risks in any way is not permitted. Shrimp and certain other shellfish species pasteurized by conventional methods, but in a manner so as to produce refrigerated products possessing the desirable sensory attributes of high quality fresh seafoods, are typically unmarketable since such methods do not attain the levels of heat exposure (non-proteolytic *C. botulinum* lethalities) necessary to achieve the food safety requirements of the U.S. FDA. For example, the practice of sub-lethal thermal processing of shellfish such as the blue crab, which, by definition is not pasteurization, has been identified by the National Blue Crab Industry Association as hazardous and unacceptable with respect to sealed, refrigerated, blue crab meat. By definition, pasteurized crab meat is heated in hermetically sealed containers for a given length of time and at a temperature sufficient to destroy all vegetative pathogenic organisms and spores of non-proteolytic *C. botulinum*, but not to the degree of commercial sterilization. Crab meat in hermetically sealed containers prepared using mild partial pasteurization processing techniques, for example, at a time and temperature just sufficient to achieve six decimal reductions of *Listeria monocytogenes* are acceptable and permitted but only if the product is frozen and maintained frozen throughout distribution and sale.

When shrimp and other shellfish are pasteurized in accordance with requirements specified by the FDA, however, several unfavorable conditions are typically imparted to the shellfish. For example, when raw shrimp, as well as many other shellfish species, are packed in a sealed container and heated to levels considered safe by the FDA, excessive shrinkage of the shrimp or other shellfish pieces occurs. Cook-out liquid, or 'purge' as it is also known, results and the volume of such liquid is often equivalent to 30-60 percent of the total volume of the sealed container. The consumer, thus, purchases a container of shellfish product that is approximately only half shellfish meat by weight and half liquid. To make matters worse, this so-called purge is also often in the form of a cloudy or milky liquid containing protein curd, which is unappealing to the consumer, rendering the product unmarketable.

The muscle of the shrimp and other shellfish also often toughens and becomes increasingly dense when processed according to the minimum pasteurization processes required by FDA to meet food safety requirements. As a result, the meat when eaten has a rubbery texture that is difficult to fracture when chewed. Another unfavorable condition that results from these known processes is that shrimp or other shellfish lose their characteristic odor and flavor when processed.

Even when shrimp and other types of shellfish are "pre-cooked" prior to the pasteurization process, which is typical in most standard commercial practices, the problems outlined above are not significantly diminished. Unlike swimming crabs, shrimp, as historically pre-cooked commercially, are exposed to a much lower level of heat than is applied during pasteurization. When temperatures during the pasteurization process exceed those of the initial cooking stage, water and solubilized proteins are driven out of shrimp muscle and into the cooking container, which coagulates producing a cloudy cook-out liquid of poor visual appeal. Additionally, the thermal processes required for pasteurization commonly leave shrimp and other shellfish muscle dehydrated, tough and significantly reduced in size.

Attempts to address some of the problems identified above have included soaking the shrimp or other shellfish in water or water-based solutions prior to cooking to increase the amount of water in the raw shellfish so as to retain more water in the shellfish muscle after it is cooked. Increasing the amount of water absorbed in raw or mildly pre-cooked shrimp and other shellfish through the use of extended soaks, either with or without additives, however, only exacerbates quality defects in the finished pasteurized product. Such attempts to improve the yield of cooked shrimp and other shellfish through prolonged water exposure prior to cooking is so pervasive in the industry that previous attempts to pasteurize these products may have been thwarted in part by consequentially high cook-out losses and related textural and appearance defects.

One example of a prior process is disclosed in commonly owned US 2006/0222747. The process produces a packaged shellfish, such as shrimp, by cooking in steam or boiling water to partially cook the shellfish. The partially cooked shellfish is packaged in a closed container and heated to pasteurize the shellfish. It has been found that this process does not produce a packaged product with an adequate shelf life having a suitable texture and taste. Partially cooking the shellfish in saturated steam or boiling water overcooks the exterior of the shellfish and under-cooks the center, resulting in both a tough and rubbery texture and poor appearance due to formation of protein curd from un-coagulated proteins during subsequent pasteurization and storage, rendering the product unsuitable for commercial applications.

Thus, there is a need for a method for processing the meat of shrimp and other shellfish, including various species of clams, scallops and lobster that provides a significant refrigerated shelf-life for the packaged food without causing unfavorable consumer-related characteristics to be imparted to the shellfish product.

SUMMARY OF THE INVENTION

Embodiments in accordance with the invention disclosed herein overcome one or more of the above-mentioned problems by producing shrimp and other shellfish of near fresh sensory quality for marketing as refrigerated products, not canned products held at ambient, non-refrigerated temperatures.

As used herein, the terms "shellfish" and "shellfish product" are used interchangeably and refer to either the entire or shell-on shellfish, such as shrimp, clams, scallops, crayfish, squid and lobster, or to the edible meat portions of such a shellfish when removed from the shell. In one embodiment, the invention is directed to processing shellfish other than crab and meat that is more tolerant to heating compared to shrimp. The shellfish can be fresh or previously frozen or pretreated with a phosphate solution prior to freezing.

An object of one or more embodiments of the invention is to provide a process for extending the refrigerated shelf-life of shellfish, and particularly shrimp, while maintaining their desirable fresh-like eating qualities and meeting all food safety requirements.

An additional object of one or more embodiments of the invention is to provide a process by which the natural flavor and texture of the shellfish is retained after the shellfish is processed.

According to one exemplary embodiment a method of processing a shellfish product is disclosed that includes submersing the raw or uncooked shellfish product in a brine solution heated to sub-boiling temperatures to pre-cook the shellfish product, or pre-cooking previously brined shellfish under high humidity conditions, cooling the resulting pre-cooked shellfish product in a first ice bath or refrigerated bath, packing the cooled shellfish product in a container suitable to withstand pasteurization temperatures, filling the container with brine prior to seaming/sealing, pasteurizing the packaged shellfish product in an agitated hot water bath at a temperature between 185° F. and 190° F., and cooling the pasteurized shellfish product in a second ice bath or refrigerated bath.

According to a further embodiment a system and assembly for processing a shellfish product is disclosed which includes a pre-cooker in which the shellfish product is submersed in a heated brine solution, a first cooling apparatus accommodating a first ice bath or refrigerated bath into which the shellfish product is placed upon removal from the pre-cooker, the first ice bath or refrigerated bath including a brine solution having a concentration between 1.25 and 2.00 wt % salt, a pasteurizing apparatus for heating the packaged and sealed shellfish product in an agitated hot water bath at a temperature between 185 and 190° F., and a second cooling apparatus accommodating a second ice bath or refrigerated bath into which the shellfish product is placed upon removal from the pasteurizing apparatus.

Various embodiments of the invention define process conditions and steps that when followed result in premium pasteurized shrimp and other shellfish products with an extended shelf-life when kept under refrigeration. The embodiments expressly disclosed herein, as well as others within the scope of the invention are distinguished from canned shrimp and other shellfish products that are also processed using a terminal heating step.

The word pasteurization implies refrigerated foods; canning implies shelf-stable non-refrigerated, canned foods. Canned foods, including canned shrimp and other shellfish, are heated in pressurized steam vessels (retorts) to much higher temperatures and total heat exposure than the conditions described according to embodiments of this invention. Canned shrimp and other shellfish, like other canned foods fall under specific U.S. FDA regulations for thermally processed shelf-stable foods not requiring refrigeration (21 C.F.R. 113 covering Low Acid Canned Foods (LACF)). The conditions necessary to meet LACF requirements produce shrimp and other shellfish of poor sensory quality. High levels of salt are typically required for texture control (e.g., 4-5 wt % NaCl) and typically organic acids and/or chelators are added to preserve color in the prior processes. Even with these additives, neither texture or color, or other sensory attributes are similar to fresh cooked shrimp and other shellfish.

Shelf-stable canned seafoods are sold at retail along with numerous other canned foods in grocery aisles where they are not readily differentiated from other canned seafoods, potted meats and other products marketed at room temperature. Refrigerated and iced seafoods are sold in the fresh seafood department of grocery stores where consumers are more likely to perceive them as fresh and less processed. When combined with the extended shelf-life afforded by this invention, significant product appeal is achieved related to its association with other fresh refrigerated or iced seafood. The high quality and convenience of refrigerated, pasteurized seafoods extend also to foodservice and institutional markets, where extended shelf-life provides inventory and distribution control unavailable to other fresh seafoods, and, to users of frozen products, also eliminates the time and facilities required for thawing.

Exemplary embodiments of the invention include one or more of the following steps, pre-cooking shrimp and other shellfish before packing to a final internal shellfish temperature near or above the temperature attained during later pasteurization, and doing so by either 1) submerging raw shellfish (peeled or unpeeled) in a heated sodium chloride solution (1.25-2.0 wt % NaCl, preferably 1.5-1.75 wt % NaCl) at 180-190° F. (preferably 185-188° F.) until internal shellfish temperatures reach the cooking medium temperature, or 2) short soaking, or dipping and holding raw (peeled or unpeeled) shellfish in a 1.25-2.0 wt % NaCl solution, preferably 1.5-1.75 wt % NaCl, followed by cooking at 180-190° F. (preferably 185-188° F.) under high humidity until internal shellfish temperatures reach the cooking medium temperature; rapidly cooling the pre-cooked shellfish in a chilled 1.25-2.0 wt % NaCl solution (preferably 1.5-1.75 wt % NaCl); rinsing the resulting pre-cooked shellfish meats in 1.25-2.0 wt % NaCl solution, preferably 1.5-1.75 wt % NaCl solution; packing rigid or semi-rigid containers with the pre-cooked shellfish; filling the packed product containers with brine (1.25-2.0 wt %, preferably 1.5-1.75 wt % NaCl); seaming/sealing the containers; heat pasteurizing the packaged shellfish at or below 190° F. (preferably 185-188° F.), but no hotter than the maximum internal shellfish temperature achieved during the earlier cooking step, using a tightly controlled, vigorously and uniformly agitated submerged bath which optimizes heat transfer rates; and rapidly cooling the pasteurized shellfish.

Additionally, the use of containers that have a high surface to volume ratio (for example, tapered or tall and narrow or wider than they are tall or thick) to facilitate heat transfer, including shallow or small plastic cans with seal-top lids, similarly shaped metal cans, or plastic or foil pouches/bags further facilitate and assist the beneficial attributes rendered onto the shellfish product when prepared and processed in accordance with one or more embodiments of the invention.

These and other features of the invention will become apparent from the following detailed description of the invention which discloses various embodiments of the invention.

BRIEF DESCRIPTION OF THE DRAWING

The FIGURE is a schematic diagram of the apparatus in one embodiment of the invention.

DETAILED DESCRIPTION OF THE INVENTION

The method of the invention results in a packaged shellfish having an extended refrigerated shelf-life where the shellfish has a flavor and texture similar to a freshly prepared shellfish. The process of the invention is particularly directed to cooking and packaging shrimp, clams, scallops, crayfish, squid and lobster. The shellfish can be immersed in an aqueous medium in the package. The method of the invention produces a packaged product where the aqueous medium remains clear or substantially clear after pasteurization and during storage without the formation of the cloudy solution, often containing fine particulates, obtained according to the prior processes.

The method of the invention pre-cooks the shellfish at a first temperature and for a period of time sufficient to fully cook the shellfish without excessive unnecessary denaturation of the proteins. The pre-cooked shellfish is then packaged in a closed container and heat pasteurized at a second temperature not higher than the first temperature. The closed container can include a brine solution as an aqueous storage medium in an amount to cover the shellfish entirely during storage.

In one embodiment of the invention, the raw, uncooked shellfish is converted into a refrigerator-stable, pasteurized, packaged product with a multi-step process based on a pre-cooking step that is at least as high as a subsequent pasteurization step. This sequence of heating steps allows the proteins in the shellfish to become fully cooked and coagulated in the relatively short pre-cooking step so that the additional heating and holding time of the later pasteurizing step does not cause additional purge or protein curd that would adversely affect the marketability of the product. In a preferred embodiment, (step 1) the uncooked shellfish is pre-cooked by immersion in a heated first brine solution having a salt (NaCl) concentration of not more than 2 wt % and a temperature within the range of at least 180° F. and not more than 190° F. for a time shorter than the later pasteurization step but for a sufficient time to fully cook the shellfish to a uniform temperature and to coagulate the proteins. The shellfish is preferably pre-cooked to coagulate the proteins substantially uniformly throughout the shellfish. The precise pre-cooking time for the specific shellfish and size is preferably established from calibration tests of the equipment using no more than the existing skill level within the art so as to achieve an internal end-point temperature of the shellfish that reaches the temperature of the first brine solution and that is equal to or slightly exceeding that attained during the later pasteurization step. At the end of the pre-cooking step, (step 2) the shellfish is rapidly cooled to stop the pre-cooking process. Preferably, the pre-cooked shellfish is quickly cooled to a temperature below approximately 40° F. such as by immersing the pre-cooked shrimp pieces in a cold, second brine solution such as an ice water bath containing not more than 2 wt % salt. The cooled, pre-cooked shellfish is then (optional step 3) rinsed with a brine to remove any curd or solids on the pre-cooked shrimp. The clean, pre-cooked shellfish is then (step 4) placed in a sealable container which contains or to which is added a third brine solution. This third brine solution preferably has not more than 2 wt % salt, and its use is optional when using vacuum-sealed, flexible, packaging. Preferably, the third brine solution is added to the container in an amount that is sufficient to cover the shellfish so that the shellfish remains submerged in the solution during later pasteurization and storage. The covering third brine solution also helps to conduct heat throughout the package for a more efficient pasteurization step. The packaged shellfish is then (step 5) heat pasteurized by uniformly heating the container to a temperature of up to 190° F. but not more than the pre-cooking temperature. The heat pasteurizing is carried out for a longer time than the pre-cooking step that is sufficient time to pasteurize the shellfish within the container according to the government standards. As soon as the pasteurizing temperature and time are attained, (step 6) the packaged shellfish is rapidly cooled to refrigeration temperature of about 40° F. or lower.

Exemplary embodiments of the present invention are specifically described below based on examples, but the scope of the present invention is in no way limited to the embodiments and examples expressly disclosed. Those of skill in the art will understand that additions, revisions and other modifications to certain expressed details of the exemplary embodiments described herein can be made without departing from the spirit and scope of the invention.

In accordance with exemplary embodiments, overcoming some or all of the previously described quality defects in properly pasteurized shrimp and other shellfish products prepared in accordance with conventional methods includes one or more specific process steps which are described in further detail below. These steps include pre-cooking the shrimp or other shellfish, adding brine to rigid and semi-rigid containers—a step which is optional when the shellfish product is packaged in vacuum sealed bags or pouches—selecting the appropriate container, and pasteurization heating and cooling using the appropriate equipment.

In accordance with at least one embodiment of the invention each of the process steps and features outlined above are addressed by utilizing a system of procedures and controls that produce finished refrigerated, pasteurized shrimp and other shellfish products possessing a number of desirable attributes. The resulting pasteurized products are stable under refrigeration for extended periods of time. For example, shrimp and other shellfish processed in accordance with embodiments of the invention are plump and typically fill the container in which they are packaged. Additionally, the meat of shellfish products processed according to embodiments of the invention are tender and possesses a sweet aroma and flavor characteristic consistent with the particular type of shellfish and/or species. Clear brine within the package also results which permits high visibility of the shellfish which improves visual appeal to the consumer. Lastly, processing shellfish products in accordance with the invention produces a packaged product that has a 9-18 month refrigerated shelf-life.

The invention is directed to a method of producing a packaged shellfish that is stable for about 9-18 months when stored under refrigeration of about 40° F. or less. The method of the invention in one embodiment includes the steps of quickly pre-cooking the shellfish in a preheated aqueous brine solution to obtain a pre-cooked shellfish. The shellfish is heated at sub-boiling temperatures for a sufficient time for the shellfish to reach an internal temperature substantially equal to the temperature of the heated brine solution. The raw and uncooked shellfish is heated for a time sufficient to pre-cook the shellfish uniformly without excessive heating beyond that necessary to reach the internal temperature corresponding to the temperature of the heated brine solution, thereby preventing overcooking that can result in a tough, rubbery texture. The pre-cooking step can be carried out for a time sufficient to coagulate the proteins fully without excessive heating or overcooking. The heated brine solution has a salt concentration that limits the amount of salt absorbed by the shellfish. In one embodiment of the invention, the heated bring solution has a salt (NaCl) concentration of not more than 2 wt %. The heated brine solution preferably has a salt concentration of 1.25 to 2.0 wt %, and more preferably about 1.5 to 1.75 wt %. In one embodiment, the brine solution has a NaCl concentration of about 1.6 to 1.7 wt %.

The pre-cooking temperature of the raw, uncooked shellfish in one embodiment does not exceed about 190° F. so that the internal temperature of the resulting pre-cooked shellfish at no time exceeds 190° F. to limit the extent of protein denaturation. The cooking temperature is preferably about 180° to 190° F. The maximum temperature of 190° F. avoids or inhibits excessive cooking and protein denaturation so that the shellfish retains sufficient water, texture and organoleptic properties during storage after pasteurization. The ratio of the weight or volume of the shellfish to the volume of the heated brine solution is selected to enable the shellfish to reach an internal temperature of the heated brine solution rapidly to minimize the temperature drop or reduction upon immersion of the quantity of shellfish in the brine solution, to enable the shellfish to reach the desired internal temperature quickly to provide a uniformly cooked shellfish, and to minimize the heating or cooking time. The shellfish is fully cooked in the pre-cooking step.

The sodium chloride concentration of the brine solution in the pre-cooking step is preferably not more than about 2 wt % and at least about 1.25 wt %. It has been found that the salt concentration in this range retains a desirable product flavor and textural attributes while protecting the shellfish muscle from dehydration, and so that the subsequent pasteurizing step does not cause excessive release of liquid or solids from the shellfish. It has been found that pasteurizing the shellfish at a temperature not higher than the pre-cooking temperature inhibits the release of excess liquid and solids from the shellfish during the pasteurizing step that can otherwise result in liquid in the container becoming cloudy or forming proteinaceous particulates and sediment during storage.

According to an exemplary embodiment of the invention, one or more of the above-mentioned favorable attributes are achieved by pre-cooking the shrimp or other shellfish either directly in a preheated brine solution before packing/pasteurizing or alternatively, by pre-brining the raw shellfish in an unheated solution of 1.25 to 2.0 wt % NaCl (preferably 1.50 to 1.75 wt %) before cooking in a high humidity (for example, 85-100% relative humidity at a temperature of 180° F. to 190° F. by mixing air and steam) cooker, such as a steam-air oven. According to one embodiment, raw shrimp, either peeled or unpeeled, is submerged in a pre-heated 1.25-2.0 wt % sodium chloride solution, i.e., brine to pre-cook the shrimp. In one embodiment, the pre-cooking brine contains sodium chloride as the only salt. According to a further embodiment, the brine solution used, whether as a pre-brining step or the cooking medium, can be a 1.50-1.75 wt % salt solution. The brine solution or other heating medium in the pre-cooking step is maintained at a temperature of about 180° F. to 190° F., and ideally about 185° F. to 188° F. According to this embodiment the pre-cooking step is continued until the internal temperature of the shellfish product reaches the temperature of the cooking medium, i.e., the brine or other heating medium. In one embodiment of this invention, the pre-cooking temperature closely approaches, or slightly exceeds, the temperature that the shellfish will reach when pasteurized in the subsequent pasteurization step. In one embodiment the shellfish is pre-cooked to an internal temperature at least as high as the subsequent pasteurizing step.

When the shellfish product reaches the desired internal temperature pursuant to the pre-cooking step of not higher than 190° F., the shellfish is immediately transferred to a cooling liquid, such as an ice bath or refrigerated bath or slush, i.e., a mixture of water and ice, to quickly remove the heat and chill the shellfish and stop the cooking process. To assist in removing the heat even more quickly, the ice slush or refrigerated bath is agitated, e.g., either manually, through injection of air or other gas, or with mechanized assistance to facilitate heat transfer and maintain a more even temperature distribution within the slush or bath. According to this embodiment the ice slush also contains 1.25-2.0 wt % NaCl, and ideally 1.50-1.75 wt % NaCl. The addition of salt to the ice slush or cooling bath minimizes absorption of water by the shellfish which, being weakly bound, would be released or cook out during the subsequent pasteurization step, described below or during storage. The cooling liquid is typically maintained at a temperature of 35° F. or lower. The cooling liquid provides a heat exchange medium to stop the cooking process quickly. The cooling liquid also washes and removes any solids, such as coagulated proteins released during the cooking process.

According to further aspects of this embodiment the shellfish meat should be chilled to 40° F. after cooking or below before further handling. After chilling, the shellfish should be rinsed at least once with a 1.25-2.0 wt % brine solution, and ideally a 1.50-1.75 wt % solution to remove any solids. The shellfish are then packed to the desired amount, e.g., desired weight, in pasteurizable packaging appropriate for rapid heat-transfer, such as rigid and semi-rigid containers that are preferably wider than they are tall, or pouches or bags. One such suitable container is the model ES 40106 S/T 6 oz. container with the LPF 402, 401 FPPO Bowl lid by King Plastics, Inc., but other suitable containers with various capacities and lids can also be used in accordance with embodiments of the invention. The packaged shellfish are stored at a refrigeration temperature and preferably at a temperature of 32° F. to 36° F.

The pre-cooked, chilled and rinsed shellfish such as shrimp are then placed in a rigid container. The container is filled with an aqueous storage liquid and preferably a brine having a NaCl concentration of about 1.25 wt % to 2.0 wt % and preferably about 1.50 wt % to 1.75 wt %. The brine fills the container to submerge the shellfish completely during the pasteurizing step and during storage. The aqueous brine solution rapidly conducts heat from the container wall to heat the shellfish quickly and uniformly to the pasteurizing temperature to pasteurize the shellfish without excessive or prolonged heating. The aqueous brine solution enables rapid pasteurization while protecting proteins from excessive denaturation.

In the embodiments in which rigid or semi-rigid containers are used, the previously packed containers containing the shellfish are filled to the brim with a 1.25-2.0 wt % brine solution, and ideally a 1.50-1.75 wt % brine solution. The containers are then closed and sealed or seamed. The closed and sealed containers are preferably hermetically sealed. The filled and seamed/sealed packaging is then transferred to the pasteurizing step and loaded into highly perforated pasteurization baskets.

The sealed containers are heated at a pasteurizing temperature for a time sufficient to pasteurize the shellfish. In one embodiment, the sealed containers are placed in a hot water bath to heat the container, the shellfish and the aqueous storage medium to a temperature of up to 190° F. and not higher than the temperature of the pre-cooking step. Typically, the pasteurizing temperature is at least 185° F.

According to another embodiment, the pre-cooked and cooled shellfish are placed in flexible pouches or bags, which are made, for example, of boilable, heat resistant plastic or foil laminate, and are vacuum sealed according to known methods. The pouches or bags are typically vacuum sealed so that the package contains no added liquid or aqueous storage medium. The vacuum sealed pouches allow direct heating of the shellfish though the pouch without the need for added liquid or brine. This embodiment produces rapid and uniform heating to a pasteurizing temperature and for a time sufficient to achieve the necessary heat exposure without the need for packaging in aqueous brine solution. As with other types of packaging, the pasteurizing temperature is preferably at least 185° F. and not higher than the maximum temperature achieved during pre-cooking.

In a further embodiment of the invention, prior to the pre-cooking step, the raw shellfish is submerged in a pre-treatment solution of a water retention additive, such as sodium tripolyphosphate, other phosphate, non-phosphate blend or other additive or additive blend such as sodium bicarbonate or proteins that increases the water holding capacity of shellfish muscle. Preferably, the pre-treatment solution is functionally equivalent to a sodium tripolyphosphate concentration of less than or equal to about 4.0 wt % of the polyphosphate or its functional equivalent if other water retention additives are used. One example of a water retention additive that does not contain phosphates is sold under the trade name "Seafood Blend" by A&B Chemical Company. Additionally, the length of time the raw shellfish is submerged in the pre-treatment solution is preferably less than about 20 minutes, and ideally less than about 5 minutes. This optional soak and pre-treatment step has been found to further improve the moisture retention and texture of the final shellfish product. In one embodiment, the pre-treatment solution containing water retention additives also contains 1.0-1.5 wt % sodium chloride. The raw shellfish can be a previously frozen shellfish that was pre-treated with a brine or phosphate solution prior to freezing.

The shellfish that is pretreated with the water retention additive solution can be then pre-cooked in steam/air mixture as an alternative to hot brine at a temperature of not higher than 190° F. and preferably at a temperature range of about 180° F. to 190° F. The pre-cooking atmosphere preferably has a high humidity in a range of about 85-100% relative humidity. The relative humidity can be obtained from a mixture of steam and air to maintain the cooking atmosphere at a temperature of about 180-190° F. As in the previous embodiment, the shellfish is held in the cooking atmosphere for a time sufficient for the shellfish to reach an internal temperature equal to the cooking atmosphere and not higher than 190° F. As in the previous embodiments, the shellfish at the end of the cooking step is immediately placed in a cooling liquid and rinsed with the brine solution to remove any solids on the surface of the shellfish, such as proteins that cook out of the shellfish. The resulting pre-cooked shellfish is then packaged and pasteurized as in the previous embodiment.

A further step in accordance with one or more embodiments of the invention is the pasteurization step after the pre-cooking step and after the packaging step. More particularly, the pasteurization step according to the present embodiment can involve submersing the packaged shellfish product, typically held in a pasteurization basket, in a tightly controlled, uniformly agitated hot water bath to provide rapid and uniform heating while minimizing excessive heat exposure, to a pasteurizing temperature and for a time sufficient for the shellfish to achieve the necessary microbiological lethality. The pasteurizing temperature is preferably at least 185° F. and not higher than the maximum pre-cooking temperature used. In one embodiment, the shellfish in pasteurized at a temperature not higher than 190° F. The water temperature according to this embodiment is controlled between 185° F. and 190° F. to achieve rapid heating in a range sufficient for targeted microbial kill (6D process for non-proteolytic *C. botulinum* type B) while holding the shrimp and other shellfish muscle at or below the final internal temperature achieved during the pre-cooking step. Maintaining the pasteurizing temperature at or below the pre-cooking temperature assists in maintaining the clear packing brine in the packaging containing the pasteurized finished shellfish product as well as preventing the formation of protein curd which, if present, would reduce visual appeal whether or not a brine is used. Higher pasteurizing temperatures above the pre-cooking temperature and/or prolonged cooking or pasteurization times are detrimental to the texture, appearance and other sensory attributes of the final shellfish product. Pasteurizing at a temperature above the pre-cooking temperature can cause the release of proteins or other solids from the shellfish that can cause the brine solution in the container to become cloudy. Maintaining the pasteurization temperature below the pre-cooking temperature inhibits the release of proteins into the brine and maintains the brine solution in a clear state.

When the pasteurization is completed, the packages of pasteurized shellfish are immediately and quickly chilled to 40° F. or below to stop the pasteurization process and to stop any further cooking. In one embodiment, the packages after the pasteurization heating step are transferred from the basket to an agitated ice slush or refrigerated bath and cooled to less than or equal to 40° F. A chilled liquid bath, such as an agitated ice bath have been found to quickly cool the packaged shellfish. The containers of pasteurized shellfish are then stored, shipped and warehoused at between 32° F. and 38° F. for optimal shelf-life.

The method of the invention for processing shrimp and other shellfish prolongs the shelf-life of processed shellfish and also renders it more appealing to the various senses of the consumer. It has been found that the pre-cooking in brine at a temperature not higher than 190° F., packaging in a container and pasteurizing at a temperature not higher than the cooking temperature maintains a clear brine solution in the container and maintains the desirable flavor and texture without the shellfish becoming tough or rubbery.

During the pre-cooking step, which according to at least one exemplary embodiment, includes submersing the shellfish in a hot 1.25-2.0 wt % brine at sub-boiling temperatures of not higher than 190° F., or pre-soaking shellfish in 1.25-2.0 wt % brine or phosphate solution, prior to cooking at temperatures below that of atmospheric steam (212° F.), the amount of protein denaturation with associated dehydration of the muscle tissue is minimized. When dissolved in water, sodium chloride has unique properties that interact with the muscle proteins of the shellfish. In particular, sodium ions are positively charged and chloride ions are negatively charged. The proteins found in the meat of the shellfish also have charged groups, with certain moieties being positively charged and others being negatively charged. Also, other sections of the shellfish proteins are often found to have a neutral charge. Dissimilarly charged groups, i.e., positive and negative, repel each other in water, which itself is a bipolar molecule. This holds the native proteins in the shellfish open as they interact with the water. When cations and anions, such as sodium and chloride ions, are present, they too interact with groups of opposite charge in a dynamic balance of ions and charged molecules "competing" for charged sites.

These forces of attraction and repulsion are counterbalanced by physicochemical interferences, as large ions, e.g., chloride, are less able to penetrate niches in the protein tertiary and quaternary structure than are small ions, e.g., sodium. This dynamic interaction directly affects the water retention capacity, texture and loss of small molecular weight, flavor and odor compounds of the shellfish. The addition of dissolved table salt to the system, as described above in accordance with various steps of one or more embodiments, contributes ions that enhance the ability of the shrimp and other shellfish muscle proteins to open and chemically interact, or bond, with water. When the concentrations of sodium and/or chloride ions are too high, for example, greater than 5-6 wt % NaCl, a condition known as "salting out" occurs, whereby ionic interferences are overcome and both ions, i.e., sodium and chloride, neutralize the charged groups within the proteins, causing them to collapse and interact with other regions of the protein, predominantly through hydrophobic interactions, rather than with water. This exclusion of water, known as dehydration, and the formation of inter-protein bonds are responsible for the often severe shrinkage and toughening of muscle foods like shrimp and other shellfish, a problem often encountered by conventional shellfish processing methods.

Consequently, the use of the proper concentration of salt brine during pre-cooking and inside the container during storage, as described above in accordance with the invention, is important to the sensory attributes of pasteurized shrimp and other shellfish. The use of salt, phosphate or other additives in concentrations greater than those provided in accordance with the embodiments disclosed herein, for example, more than 2.0 wt % NaCl, or phosphate soaks longer than 20 minutes, can also have the undesirable effects of either toughening or solubilizing proteins, some of which then migrate, e.g., cook-out, into the brine or as protein curd onto the surface of the shellfish particularly in the subsequent pasteurization step. The pre-treatment of the shellfish with the brine or phosphate solution before pre-cooking is preferably less than 20 minutes. Preferably the treatment time is sufficient to pre-treat the shellfish without causing proteins or solids to cook out of the shellfish during cooking, pasteurization or storage.

Rigid and semi-rigid packages, such as plastic containers of shrimp and other shellfish in brine serve another important function, i.e., significantly increasing heat penetration rates during pasteurization. Dry-packed foods heat predominantly by conduction, which typically takes a relatively long time. Heating of brine-packed or water-packed foods in accordance with embodiments of the invention, on the other hand, is assisted by convection currents which flow between food particulates, significantly speeding the pasteurization process and thereby further minimizing undesirable sensory changes in the shellfish.

The use of brine as a packing medium in the product containers according to embodiments of the invention greatly facilitates pasteurization heating and cooling rates of the shellfish, e.g., in the rigid and/or semi-rigid containers, and results in a more favorable final product. Shellfish that are vacuum packed in flexible pouches or bags may not require the addition of brine prior to sealing due to reduced interstitial spaces between shellfish pieces and the rapid heat transfer rates attainable when thinly packed, for example to thicknesses less than or equal to 1.5 inches.

It is further preferable that the pre-cooking and pasteurization equipment used in accordance with the embodiments of the invention disclosed herein be designed and operated to achieve uniformly rapid heat transfer rates to and from the shellfish product. This will ensure optimal finished product quality. Further, it is desired that heat accumulation (non-proteolytic C. botulinum lethalities) in the shellfish product during pasteurization be accomplished within and not more than about 75 minutes of submersion for many species of shellfish and preferably within and not more than about 65 minutes for shrimp at a pasteurization temperature of about 180° F. to 190° F. and preferably about 185° F. to 190° F.

The relationship between pre-cooking temperature and pasteurization temperature is an important feature of the invention. Shellfish, like other muscle foods, consist of numerous proteins possessing different properties including a range of coagulation temperatures. As raw meats are heated, certain proteins begin to coagulate and turn opaque at temperatures just below approximately 130° F. while others may require temperatures of 180-190° F. to fully coagulate. If shellfish are pre-cooked to an end-point temperature which is below the maximum temperature they reach during pasteurization, any uncoagulated protein that cooks out into the pasteurized container will coagulate on the surface of the shellfish as curd or in the brine as fine cloudy or milky particulates. This results in a very unappealing product unsuitable for retail sale. Rinsing of pre-cooked shrimp and other shellfish, such as a 1.25-2.0 wt % NaCl solution in accordance with embodiments of the invention, e.g., prior to packing, removes surface particulates, i.e. small meat pieces and curd formed from solubilized protein, that would further cloud the brine or form sediment in finished products. Therefore, the pasteurization temperature is selected to be a temperature sufficient to obtain target lethalities and desirable product sensory attributes without causing uncoagulated proteins or other substances to cook out of the shellfish into the package during pasteurization. In one embodiment of the invention, the pasteurization temperature is not higher than the pre-cooking temperature.

The apparatus for carrying out the method of the invention and for producing the storage stable shellfish is shown in the FIGURE. In the embodiment shown, the apparatus 10 is a batch or continuous process for obtaining a packaged shellfish that is stable under refrigeration for at least 9 months and up to 18 months.

The apparatus 10 includes an optional pre-treatment bath 12 containing a sufficient amount of a water retention additive solution. The raw shellfish, such as shrimp, are immersed in the pre-treatment solution for sufficient time to pre-treat the shellfish.

The pre-treated shellfish are then transferred to a pre-cooking apparatus 14. The pre-cooking apparatus contains a brine solution having a sodium chloride concentration of not more than 2.0 wt %. The brine is maintained at a constant temperature sufficient to pre-cook the shellfish by immersing the shellfish in the heated brine solution. In one embodiment, the pre-cooking apparatus includes a heat source to heat the brine solution to a temperature of about 180° F. to about 190° F.

The pre-cooking apparatus is connected to a chilling apparatus 16 to immediately chill the shellfish at the end of the pre-cooking step to stop the cooking process quickly. The chilling apparatus can include a spray of cooling medium, such as water or brine spray. In one embodiment, the cooling medium is an aqueous bath where the shellfish is immediately immersed in the aqueous bath. The aqueous bath can be an ice bath or ice/water mixture such as an ice slush. The aqueous cooling medium can have a sodium chloride concentration of not more than 2.0 wt %.

The chilled, pre-cooked shellfish is then transferred to an optional rinse apparatus 18. The rinse apparatus can be spray or a bath containing an aqueous rinse having a sodium chloride concentration of not more than 2.0 wt %.

The rinsed shellfish is then transferred to a packaging apparatus 20. The apparatus 20 places the pre-cooked shellfish in a suitable package that is able to withstand the pasteurizing temperatures. The packaging can be a flexible pouch or bag that can be vacuum sealed with or without an aqueous packaging medium. The packaging can also be a rigid container that can be closed and sealed. In one embodiment, the rigid container is filled with an aqueous packing medium to displace air from the container prior to closing, sealing and pasteurizing. The packing medium can be water or, preferably, a salt solution.

The packaged shellfish is then transferred to the pasteurizing apparatus 22 where the container and the shellfish are quickly heated to a pasteurizing temperature and held at that temperature. In one embodiment, the pasteurizing apparatus is a heated aqueous bath. The containers can be placed in a suitable partitioned basket or rack and immersed in the heated bath for sufficient time to pasteurize the shellfish. The containers are then transferred to a chilling apparatus 24, such as a cooled aqueous medium to lower the temperature of the container and the shellfish and quickly stop any further pasteurization or cooking.

Example

The following is one example of the process for producing a packaged shrimp that is stable at refrigerated temperatures.

1. Frozen raw shrimp that was pretreated with water retention additives, such as sodium tripolyphosphate, prior to freezing was thawed.

2. The thawed shrimp was cooked in a highly perforated basket in an agitated hot brine (1.65 percent NaCl) at 187° F. Cooking continues until the internal shrimp temperature reaches 186.5° F. as determined by internal probes or by previous study, approximately 6.5 minutes for 41/50 count shrimp.

3. Immediately cool the shrimp by immersing in an agitated brine bath (1.65 percent NaCl) chilled mechanically or with ice.
4. Rinse the cooked shrimp twice by immersing in 1.65 percent brine solutions to remove fine proteinaceous particulates from shrimp surface.
5. Pack the cooked shrimp in King Plastics 40106 clear, flat plastic cans to 6 ounce net weight, arranging shrimp in the cans for optimal visual consumer appeal.
6. Fill the packed cans to the brim with 1.65 percent brine.
7. Seam the cans with easy open lids according to manufacturer's specifications.
8. Place the cans in a highly perforated pasteurization basket with separators and top plate designed for this container.
9. Submerge the basket of cans in an agitated hot water bath pasteurizer at 186° F., and process for the time necessary to meet FDA requirements for control of non-proteolytic *Clostridium botulinum* type B bacteria. This time is determined by heat penetration studies performed under commercial conditions.
10. Immediately transfer the basket of cans to an agitated, ice-chilled water bath and cool until the internal temperature of the shrimp reaches 38° F. or below, as measured by study at can center.
11. Immediately remove the cans of finished pasteurized shrimp from the basket and move to refrigerated storage at less than or equal to 36° F. Refrigeration temperatures are maintained during storage, shipment and distribution.

While various features and embodiments of the invention are disclosed herein, it will be understood that various changes and modifications can be made without departing from the scope of the claims as defined in the appended claims.

What is claimed is:

1. A method of producing a pasteurized, shrimp food product having an extended shelf life under refrigeration conditions, said method consisting essentially of the steps:
   pre-cooking uncooked shrimp to a first, selected, internal, pre-cooking temperature that is within the range of 185°-190° F. for a time sufficient to coagulate proteins in the shrimp to obtain pre-cooked shrimp;
   immediately cooling the pre-cooked shrimp with a cold brine containing 1.25-2 wt % salt to a temperature that is about 40° F. or less and that is sufficiently low to stop the cooking process and produce cooled shrimp;
   rinsing said cooled shrimp with a 1.25-2 wt % brine rinsing solution to remove any coagulated proteins released during the pre-cooking step;
   packaging the cooled, rinsed shrimp in soft, semi-rigid, or rigid containers that are conducive to rapid heat penetration and suitable to withstand pasteurization temperatures;
   filling the semi-rigid or rigid containers of cooled, rinsed, shrimp with a packing brine in an amount sufficient to submerge the cooled, rinsed, shrimp completely, or filling the soft containers with cooled, rinsed shrimp;
   seaming or sealing the soft, semi-rigid or rigid containers of cooled, rinsed, shrimp;
   pasteurizing the soft, semi-rigid or rigid containers of cooled, rinsed, shrimp by heating the packaged shrimp to a pasteurizing temperature that is within the range of 185°-190° F. and said pasteurizing temperature is not higher than said internal pre-cooking temperature to avoid the release of protein from the packaged shrimp, said pasteurizing step occurring for a time sufficient to achieve control of nonproteolytic *C. botulinum* type B for 9-18 months under refrigeration conditions; and
   immediately cooling the pasteurized, packaged, shrimp by immersing the pasteurized, packaged, shrimp containers in a cold water bath to stop pasteurization and produce a packaged, pasteurized, fresh, shrimp product that is stable for about 9-18 months when stored at refrigeration conditions of 32°-40° F.

2. The method of claim 1, wherein the pre-cooking step occurs in a high humidity atmosphere having a relative humidity of 85-100%.

3. The method of claim 1, wherein said pre-cooking step is at a pre-cooking temperature within the range of 185°-188° F., and said pasteurizing temperature is within the range of 185°-188° F. and is selected so that the pasteurization temperature does not exceed the pre-cooking temperature.

4. The method of claim 1 wherein the pre-cooking internal temperature and the pasteurizing temperature are each at a temperature selected from within the range of 185°-188° F.

5. A method of producing a refrigerated, packaged, stable, shrimp product consisting of the steps of:
   pre-treating uncooked shrimp by soaking said shrimp in a pre-treating solution containing a water retention additive that increases a water holding capacity of shrimp muscle and optionally containing sodium chloride,
   precooking the pre-treated, uncooked shrimp to a pre-cooking internal temperature within the range of 185°-190° F. in a high humidity oven having a relative humidity of 85-100%, or in a hot, first brine solution for a time that is sufficient to cook and coagulate protein in said shrimp, said first brine solution or oven being maintained at a pre-cooking temperature within the range of 185°-190° F.;
   immediately cooling the pre-cooked shrimp with a cold, second brine having a salt concentration within the range of about 1.25 wt % to about 2.0 wt %,
   packing the cooled shrimp in a container and sealing the container,
   heating said container and its contents to a pasteurizing temperature within the range of 185°-190° F. and that is not higher than said pre-cooking internal temperature and maintained at said pasteurizing temperature for a time sufficient to pasteurize said shrimp for a time sufficient to achieve control of nonproteolytic *C. botulinum* type B and to obtain said refrigerator-stable, pasteurized, packaged shrimp product having a shelf life of 9-18 months under refrigeration conditions within 32°-40° F., and
   immediately cooling the container to stop the pasteurizing process of the shrimp within the container.

6. The method of claim 5 wherein the internal pre-cooking temperature and the internal temperature are each at a temperature selected from within the range of 185°-188° F.

* * * * *